United States Patent
Ahn et al.

(10) Patent No.: US 10,973,047 B2
(45) Date of Patent: Apr. 6, 2021

(54) METHOD AND APPARATUS FOR SUPPORTING VARIABLE BANDWIDTH

(71) Applicant: LG Electronics Inc., Seoul (KR)

(72) Inventors: Joonkui Ahn, Seoul (KR); Sukhyon Yoon, Seoul (KR); Changhwan Park, Seoul (KR); Seokmin Shin, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/490,526

(22) PCT Filed: Feb. 28, 2018

(86) PCT No.: PCT/KR2018/002478
§ 371 (c)(1),
(2) Date: Aug. 31, 2019

(87) PCT Pub. No.: WO2018/160008
PCT Pub. Date: Sep. 7, 2018

(65) Prior Publication Data
US 2020/0015262 A1  Jan. 9, 2020

Related U.S. Application Data

(60) Provisional application No. 62/466,350, filed on Mar. 2, 2017.

(51) Int. Cl.
*H04W 4/00* (2018.01)
*H04W 72/12* (2009.01)
*H04W 76/10* (2018.01)
*H04J 11/00* (2006.01)
(Continued)

(52) U.S. Cl.
CPC ..... *H04W 72/1289* (2013.01); *H04J 11/0073* (2013.01); *H04J 11/0076* (2013.01); *H04J 11/0079* (2013.01); *H04W 48/10* (2013.01); *H04W 74/0833* (2013.01); *H04W 76/10* (2018.02); *H04J 2211/005* (2013.01)

(58) Field of Classification Search
CPC . H04W 72/1289; H04W 76/10; H04W 48/10; H04W 74/0833; H04W 56/0015; H04W 28/20; H04J 11/0073; H04J 11/0076; H04J 11/0079; H04J 2211/005
USPC ................................. 370/329, 330
See application file for complete search history.

(56) References Cited

U.S. PATENT DOCUMENTS

| | | | | |
|---|---|---|---|---|
| 2015/0085717 A1* | 3/2015 | Papasakellariou | ........ | H04L 5/14 370/280 |
| 2018/0054333 A1* | 2/2018 | Rinne | .................... | H04W 48/12 |
| 2018/0227915 A1* | 8/2018 | Xue | .................. | H04W 72/0446 |

(Continued)

FOREIGN PATENT DOCUMENTS

| KR | 1020130086190 | 7/2013 |
|---|---|---|
| KR | 1020160013912 | 2/2016 |

(Continued)

*Primary Examiner* — Chuong T Ho
(74) *Attorney, Agent, or Firm* — Fish & Richardson P.C.

(57) ABSTRACT

Provided are a method for supporting a variable bandwidth and an apparatus using the same. In the apparatus, a wireless device receives a synchronization signal in a first bandwidth, and acquires a second bandwidth for a downlink (DL) channel on the basis of the synchronization signal. The apparatus receives the DL channel in the second bandwidth.

13 Claims, 6 Drawing Sheets

: NPBCH     : NPSS     : NSSS     : NPDCCH/NPDSCH

(51) Int. Cl.
*H04W 48/10* (2009.01)
*H04W 74/08* (2009.01)

(56) References Cited

U.S. PATENT DOCUMENTS

2018/0359653 A1* 12/2018 Svedman .............. H04W 24/10
2019/0124699 A1*  4/2019 Yamada ............ H04W 74/0866
2019/0182021 A1*  6/2019 Shokri Razaghi ...... H04L 67/10
2019/0387441 A1* 12/2019 Koskela ................ H04W 36/30

FOREIGN PATENT DOCUMENTS

| WO | WO2010147444 | 12/2010 |
| WO | WO2013141583 | 9/2013 |
| WO | WO2016043565 | 3/2016 |

* cited by examiner

METHOD AND APPARATUS FOR SUPPORTING VARIABLE BANDWIDTH

CROSS-REFERENCE TO RELATED APPLICATIONS

This application is a National Stage application under 35 U.S.C. § 371 of International Application No. PCT/KR2018/002478, filed on Feb. 28, 2018, which claims the benefit of U.S. Provisional Application No. 62/466,350, filed on Mar. 2, 2017. The disclosures of the prior applications are incorporated by reference in their entirety.

BACKGROUND OF THE INVENTION

Field of the Invention

The present invention relates to wireless communication, and more particularly, to a method of supporting a variable bandwidth in a wireless communication system, and an apparatus using the method.

Related Art

Internet of things (IoT) is a technique in which various objects including human beings transmit data through a network without human interaction.

A narrowband (NB)-IoT standardization is introduced in the 3rd generation partnership project (3GPP) to provide IoT connectivity. 3GPP LTE supports a bandwidth of at least 20 MHz. It is expected that the NB-IoT supports a bandwidth of 180 kHz or wider than that.

The NB-IoT supports three operation modes, i.e., in-band, guard band, and stand-alone. The in-band mode operates by allocating some of resources within a long-term evolution (LTE) band to the NB-IoT. The guard band mode utilizes an LTE guard band. The stand-alone mode operates by allocating some carriers within a Global System for Mobile communication (GSM) band.

Since the bandwidth has significant effect on a data throughput and resource efficiency, various techniques have been developed in order for a base station to provide a variable bandwidth to a user equipment.

In general, the NB-IoT uses a very limited bandwidth. Therefore, an amount of information data transferred through the limited bandwidth is small. A method is proposed in which variable bandwidth information is transferred dynamically through a limited bandwidth.

SUMMARY OF THE INVENTION

The present invention proposes a method of supporting a variable bandwidth in a wireless communication system, and an apparatus using the method.

In an aspect, a method for supporting a variable bandwidth in a wireless communication system is provided. The method includes receiving, by a wireless device, a synchronization signal in a first bandwidth, acquiring a second bandwidth for a downlink (DL) channel based on the synchronization signal, and receiving, by the wireless device, the DL channel in the second bandwidth.

The first bandwidth may be defined by 12 subcarriers having a subcarrier spacing of 15 kHz.

The synchronization signal may include a primary synchronization signal (PSS) for acquiring time/frequency synchronization and a secondary synchronization signal (SSS) for detecting a physical cell identifier (PCI).

In another aspect, an apparatus for supporting a variable bandwidth in a wireless communication system includes a transceiver configured to transmit and receive a radio signal, and a processor coupled to the transceiver. The processor is configured to receive a synchronization signal in a first bandwidth via the transceiver, acquire a second bandwidth for a downlink (DL) channel based on the synchronization signal, and receive the DL channel in the second bandwidth via the transceiver.

Various bandwidths can be set within a limited bandwidth between a wireless device and a base station.

DESCRIPTION OF EXEMPLARY EMBODIMENTS

Figure 1:
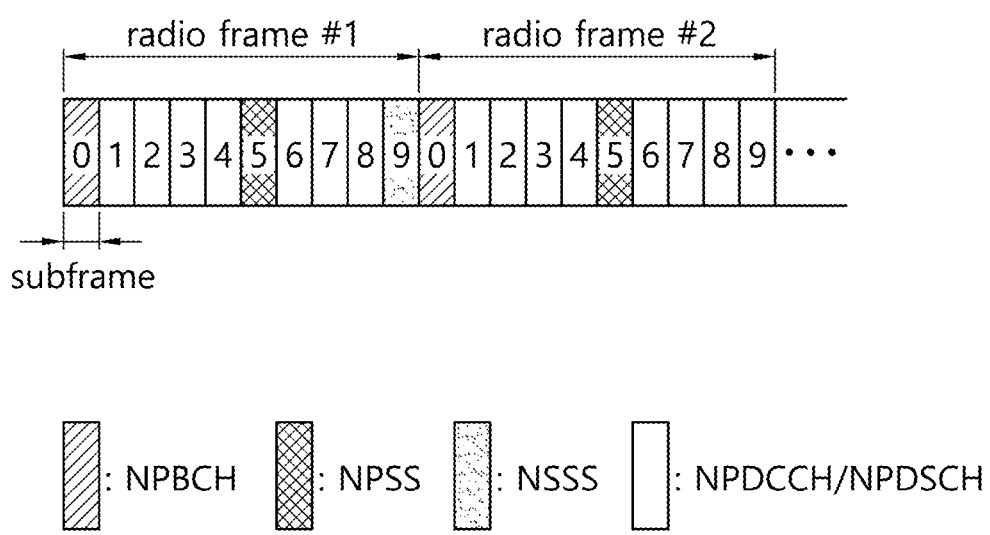
FIG. 1 shows an allocation of a DL channel in NB-IoT.

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device or an internet of things (IoT) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

Narrowband-Internet of Things (NB-IoT) is a system which supports a narrower bandwidth within a bandwidth of 3GPP LTE. The 3GPP LTE has a subcarrier spacing of 15 kHz, and supports a bandwidth of at least 20 MHz. The NB-IoT may have a subcarrier spacing of 15 kHz or 3.75 kHz or smaller than that. The NB-IoT may support a bandwidth of 3 kHz or higher than that. This is only an embodiment, and proposed embodiments are applicable to a wireless communication network supporting various bandwidths.

In the 3GPP LTE, downlink (DL)/uplink (UL) scheduling is achieved on a subframe basis. The subframe includes a plurality of orthogonal frequency division multiplexing (OFDM) symbols, and a transmission time interval (TTI) is a time required to transmit one subframe. 1 TTI may be 1 ms. One subframe includes 14 OFDM symbols in a normal cyclic prefix (CP), and one subframe includes 12 OFDM symbols in an extended CP.

In the 3GPP-based NB-IoT, a DL physical channel includes a narrowband physical broadcast channel (NPBCH), a narrowband physical downlink shared channel (NPDSCH), and a narrowband physical downlink control channel (NPDCCH). A physical signal includes a narrowband reference signal (NRS), a narrowband primary synchronization signal (NPSS), and a narrowband secondary synchronization signal (NSSS).

The NPBCH carries essential system information called a master information block (MIB). The MIB includes information regarding a system frame number, an operating mode, or the like. The NPBCH may be transmitted repeatedly up to 8 times to improve coverage.

The NPDSCH carries DL data. The NPDSCH may be transmitted repeatedly across a plurality of subframes. The NPDCCH carries DL scheduling information for the NPDSCH or UL scheduling information for UL transmission. A wireless device needs to monitor all available regions allowed for the NPDCCH, and a region for monitoring the NPDCCH in a DL subframe is called a search space. Unlike in the 3GPP LTE in which the PDCCH and the PDSCH are transmitted in one subframe, the NPDCCH and the NPDCH are transmitted in different subframes. If the NPDCCH is detected in a subframe n, the wireless device receives a corresponding NDPSCH from a subframe n+k (e.g., k=5).

FIG. 1 shows an allocation of a DL channel in NB-IoT.

A radio frame includes 10 subframes having indices 0 to 9. An NPBCH is transmitted in a first subframe (a subframe #0) of every radio frame. An NPSS is transmitted in a sixth subframe (a subframe #5) of every radio frame. An NSSS is transmitted in a last subframe (a subframe #9) of every two radio frames.

The NPSS and the NSSS may be transmitted through 12 subcarriers having a subcarrier spacing of 15 kHz.

First, a sequence dp(n) for the NPSS may be generated from a Zadoff-Chu sequence having a length of 11.

$$dp(n) = S(l) \cdot \exp\left\{\frac{-j\pi un(n+1)}{11}\right\} \quad \text{[Equation 1]}$$

Here, u=5, and a subcarrier index n=0, 1, . . . , 10. S (1) is a binary sequence, and 1 is an OFDM symbol index to which the NPSS in a subframe is mapped. 1=3, 4, . . . , 13 when a subframe includes 14 OFDM symbols having indices of 0 to 13. S (1)={1, 1, 1, 1, −1, −1,1,1,1, −1,1}.

The sequence ds(n) for the NSSS may be generated from the following Zadoff-Chu sequence.

$$ds(n) = b_q(m) \cdot \exp\{-j2\pi\theta_f n\} \cdot \exp\left\{\frac{-j\pi un'(n'+1)}{131}\right\} \quad \text{[Equation 2]}$$

$$n = 0, 1, \ldots, 131$$

$$n' = n \bmod 131$$

$$m = n \bmod 128$$

$$u = N_{PCI} \bmod 126 + 3$$

$$q = \left\lfloor \frac{N_{PCI}}{126} \right\rfloor$$

$$\theta_f = \frac{33}{132}(n_f/2) \bmod 4$$

Herein, $N_{PCI}$ is a physical cell identifier (PCI) of a cell. A binary sequence $b_q(m)$ is defined as follows according to a value q.

TABLE 1

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 −1 1 1 −1] |
| 2 | [1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1] |
| 3 | [1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 −1 1 1 −1 1 −1 −1 1 1 −1 −1 1 −1 1 1 −1 1 −1 −1 1 −1 1 1 −1] |

The sequence ds(n) is transmitted by being mapped to the remaining 11 OFDM symbols except for first three OFDM symbols out of the 14 OFDM symbols in the subframe. Since each OFDM symbol uses 12 subcarriers, the sequence ds(n) is transmitted through 132 subcarriers in total in one subframe. Up to 126×4=504 different PCIs can be identified by combining the Zadoff-Chu sequence and the binary sequence $b_q(m)$.

Figure 2:
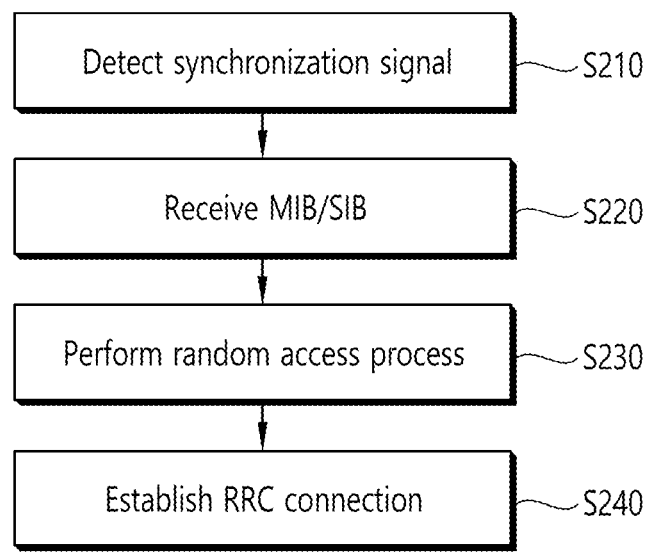
FIG. 2 shows a connection procedure in an NB-IoT system.

FIG. 2 shows a connection procedure in an NB-IoT system.

In step S210, a wireless device detects a synchronization signal (NPSS and NSSS) to first access a cell (or base station). The wireless device acquires time/frequency synchronization with the cell through the synchronization signal, and detects a PCI of the cell.

In step S220, the wireless device receives an MIB through an NPBCH, and receives a system information block (SIB) through an NPDSCH.

In step S230, the wireless device acquires information necessary for a random access procedure based on the MIB and the SIB, and performs the random access procedure with the cell. The random access procedure includes random access preamble transmission, random access response (RAR) reception through the NPDSCH scheduled with the NPDCCH, and transmission of a response for the RAR through the NPUSCH.

In step S240, the wireless device establishes a radio resource control (RRC) connection with the cell by receiving an RRC connection message from the cell. After the RRC connection is established, the wireless device may receive the NPDCCH for scheduling the NPDSCH/NPUSCH from the cell.

The following embodiment assumes communication between a base station and wireless device supporting various bandwidths. A basic bandwidth applied to an initial access between the base station and the wireless device is called BW0. In particular, in NB-IoT, the BW0 may correspond to a bandwidth of 1 resource block (RB) including 12 subcarriers or a bandwidth of about 180 kHz.

Figure 3:
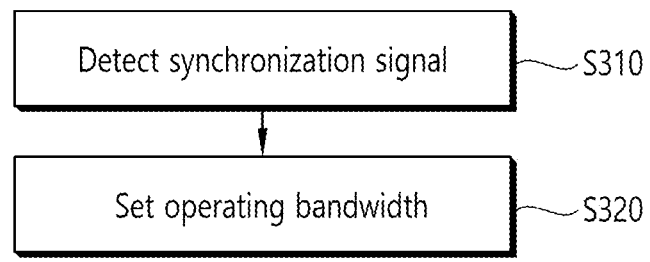
FIG. 3 shows a bandwidth supporting method according to an embodiment of the present invention.

FIG. 3 shows a bandwidth supporting method according to an embodiment of the present invention.

In step S310, a wireless device receives a synchronization signal from a base station at BW0. The synchronization signal may include at least any one of an NPSS, an NSS, and an additional synchronization signal. In step S320, the wireless device sets an operating bandwidth for DL reception on the basis of the synchronization signal. The operating bandwidth which is set after the BW0 may be greater than or equal to the BW0. The wireless device receives a DL channel according to the operating bandwidth.

As described above, it is assumed that the NPSS and the NSSS are transmitted at the BW0. That is, a bandwidth at which the NPSS and the NSSS are transmitted is the BW0. The base station may report a DL operating bandwidth to be used at a later time, through a frequency/time/sequence resource of a synchronization signal. Specifically, the DL operating bandwidth may imply at least any one of the followings.

(a) a maximum bandwidth at which system information (MIB and/or SIB) is transmitted (b) a maximum bandwidth at which a control channel (e.g., NPDCCH) for scheduling a DL data channel is transmitted (c) a maximum bandwidth at which a search space for monitoring a control channel (e.g., NPDCCH) that schedules a DL data channel can be defined (d) a maximum bandwidth at which a DL data channel (e.g., NPDSCH) can be transmitted The wireless device may receive the NPBCH/NPDCCH/NPDSCH according to the DL operating bandwidth acquired based on the synchronization signal.

The base station may report the DL operating bandwidth through a resource used actually in synchronization signal transmission among a plurality of frequency/time/sequence resource candidates that can be used when the synchronization is transmitted.

To report a plurality of operating bandwidths through the NPSS and the NSSS, the following methods or a combination thereof may be applied.

1) NPSS

A root index u of a sequence dp(m) for the NPSS according to the Equation 1 above is fixed to 5. The value u may vary depending on the operating bandwidth. For example, it may be set to u=5 if the operating bandwidth is 1 RB, and u=6 if the operating bandwidth is 2 RBs.

The binary sequence S(1) of the Equation 1 may vary depending on the operating bandwidth. For example, it may be set to S(1)={1,1,1,1,−1,−1,1,1,1,−1,1} if the operating bandwidth is 1 RB, and S(1)={−1,−1,−1,−1,1,1,−1,−1,−1,1,−1} if the operating bandwidth is 2 RBs. Alternatively, cyclic shift may be applied according to the operating bandwidth by using S(1)={1,1,1,1,−1,−1,1,1,1,−1,1} as a basic sequence.

2) NSSS

The root index u of the sequence ds(n) for the NPSS based on Equation 2 may vary depending on the operating bandwidth. Alternatively, the binary sequence $b_q(m)$ of Table 2 may vary depending on the operating bandwidth. A scrambling sequence indicating the operating bandwidth may be additionally multiplied to the sequence ds(n) for the NPSS based on Equation 2.

3) Additional Synchronization Signal

If the operating bandwidth is greater than the BW0, the NPSS and the NSSS may be transmitted at the BW0, and an additional synchronization signal may be transmitted at the operating bandwidth.

Figure 4:
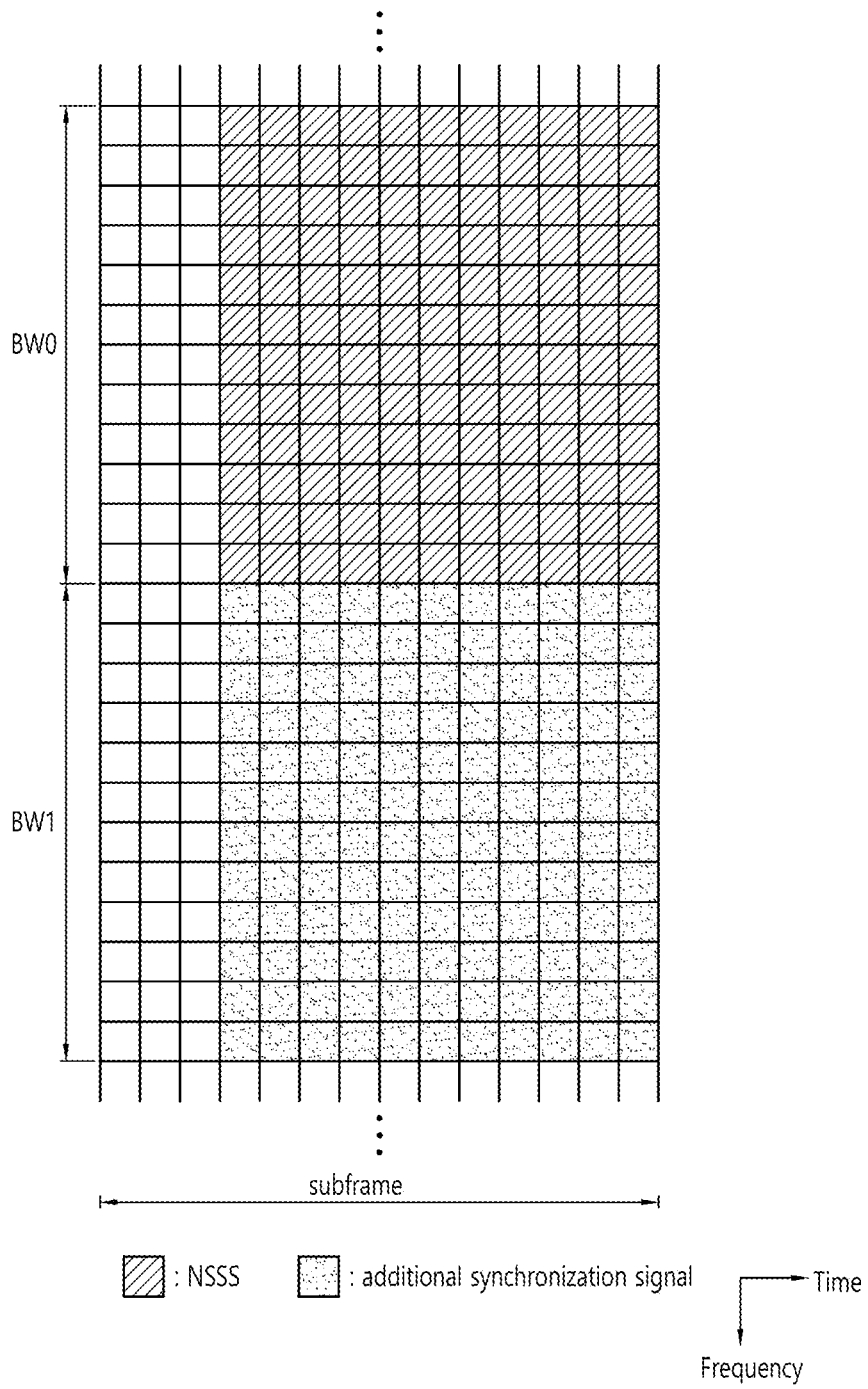
FIG. 4 shows an example of transmitting an additional synchronization signal.

FIG. 4 shows an example of transmitting an additional synchronization signal.

Assume that BW0 is 1 RB (=12 subcarriers), and BW1 is 1 RB. An NSSS is transmitted at the BW0. The additional synchronization signal is transmitted at the BW1. The additional synchronization signal may use the same sequence as an SSS. A wireless device which has detected the additional synchronization signal may recognize a band at which the additional synchronization signal is detected as an operating bandwidth (operating bandwidth=BW1), or may recognize a band including the BW0 and the BW1 as the operating bandwidth (operating bandwidth=BW0+BW1).

A sequence of the additional synchronization signal may vary depending on a size of a bandwidth to be extended. Even if the additional synchronization signal is detected at the BW1, the wireless device may recognize the operating bandwidth as BW1' according to the sequence of the additional synchronization signal.

The additional synchronization signal may be transmitted at the same timing as the NSSS. The additional synchronization signal may be transmitted in the same subframe. Alternatively, when the NSSS is transmitted in a subframe t1, the additional synchronization signal may be transmitted in a subframe t1+t3 (t3>=0). When the NPSS is transmitted in a subframe t2, the additional synchronization signal may be transmitted in a subframe t2+t3 (t3>=0).

Figure 5:
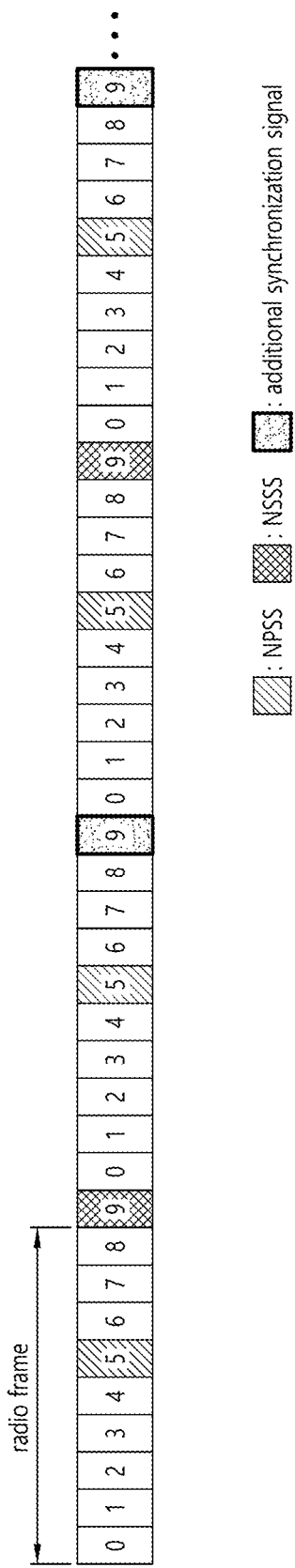
FIG. 5 shows another example of transmitting an additional synchronization signal.

FIG. 5 shows another example of transmitting an additional synchronization signal.

In NB-IoT, an NPSS is transmitted in a subframe #5 of every radio frame, and an NSSS is transmitted in a subframe #9 of every two radio subframes. The additional synchronization signal may be transmitted in the subframe #9 within a radio frame in which the NSSS is not transmitted. The additional synchronization signal is transmitted with a period of two radio frames.

A sequence for the additional synchronization signal may be the same as a sequence of the NPSS or NSSS. Alternatively, the sequence for the additional synchronization signal may be acquired based on the sequence of the NPSS or NSSS and a PCI.

The additional synchronization signal follows a structure of the NSSS, and a sequence different from a sequence to be mapped to the existing 504 PCIs may be used so that the number of PCIs that can be identified based on the NSSS. A scrambling sequence of the additional synchronization signal may be acquired based on the PCI determined by a binary sequence of the NSSS or a combination of the NPSS/NSSS. The scrambling sequence of the additional synchronization signal may be defined as a sequence number having a specific offset with respect to a binary sequence number of the NSSS.

In another embodiment, the operating bandwidth may be set by using system information. An MIB detected first by the wireless device may include information regarding the operating bandwidth. Alternatively, an SIB may include information regarding the operating bandwidth. Specifically, a DL operating bandwidth may imply at least any one of the followings.

(a) a maximum bandwidth at which subsequent system information (MIB and/or SIB) is transmitted (b) a maximum bandwidth at which a control channel (e.g., NPDCCH) for scheduling a DL data channel is transmitted (c) a maximum bandwidth at which a search space for monitoring a control channel (e.g., NPDCCH) that schedules a DL data channel can be defined (d) a maximum bandwidth at which a DL data channel (e.g., NPDSCH) can be transmitted The wireless device may receive the NPBCH/NPDCCH/NPDSCH according to the DL operating bandwidth acquired based on the system information.

The base station may use initial system information (MIB or SIB1) for which the wireless device attempts detection with a first or next priority among a plurality of system information to be broadcast to report whether system information (SIBn, n>=11) of a next priority will be reported dynamically through the NPDCCH or will be reported semi-statically through the initial system information. If a specific field in the initial system information indicates that scheduling information regarding the system information of the next priority is transmitted through the NPDCCH, the wireless device monitors the NPDCCH in the search space, and receives the system information through the NPDSCH scheduled by the detected NPDCCH.

The search space for the NPDCCH may be divided into a common search space and a UE-specific search space. The base station may set a bandwidth of the UE-specific search space independently of the common search space for the wireless device to which an RRC connection is established. This setting may be provided to the wireless device through UE-specific RRC signaling. The common search space is a common search space in which a plurality of wireless devices attempt NPDCCH detection. The NPDCCH in the common search space may be used to schedule SIB or random access-related information. The NPDCCH in the UE-specific search space may be used to schedule DL data transmitted to each wireless device. In the common search space, the wireless device may assume BW0, or may apply an operating bandwidth based on the aforementioned embodiment. In the UE-specific search space, the wireless device may apply a bandwidth allocated by RRC signaling. The wireless device may assume a bandwidth at which the NPDCCH is transmitted as a maximum bandwidth at which the NPUSCH is scheduled.

The base station may use the synchronization signal or the system information to report whether an extended bandwidth is supported. A device which supports NB-IoT of 3GPP LTE supports a bandwidth corresponding to 1 RB. However, for example, a device supporting enhanced machine type communication (eMTC) may communicate with the base station through a bandwidth greater than 6 RBs or greater than that. An initial access signal (NPSS/NSSS and NPBCH) for the NB-IoT device may be compared with a signal for the eMTC to support greater coverage through repeated transmission. Therefore, it may be more efficient that the initial access signal for the NB-IoT device is utilized for the eMTC device, rather than transmitting different synchronization signals and broadcast signals in order for the base station to support both the NB-IoT device and the eMTC device. However, since an amount of system information for the eMTC device is generally greater than an amount of system information for the NB-IoT device, the eMTC device may use a signal dedicated for eMTC, after the initial access signal based on NB-IoT is received. For this, the base station may use the NPBCH or synchronization signal (NPSS/NSSS) transmitted at the BW0 to report whether an eMTC operation is supported. Specifically, similarly to reporting of the operating bandwidth in the aforementioned embodiment, NPSS/NSSS time/frequency/sequence resources may be used to report whether the eMTC operation is supported. Alternatively, an MIB on the NPBCH may include a field indicating whether the eMTC operation is supported. The eMTC device detects the NPSS/NSSS/NPBCH at the BW0, and determines whether the base station supports the eMTC operation. If the base station supports the eMTC operation, the eMTC device attempts detection of an SIB for eMTC. If the base station does not support the eMTC operation, the eMTC device may stop the attempt for accessing the base station or may maintain the NB-IoT operation within the BW0.

Figure 6:
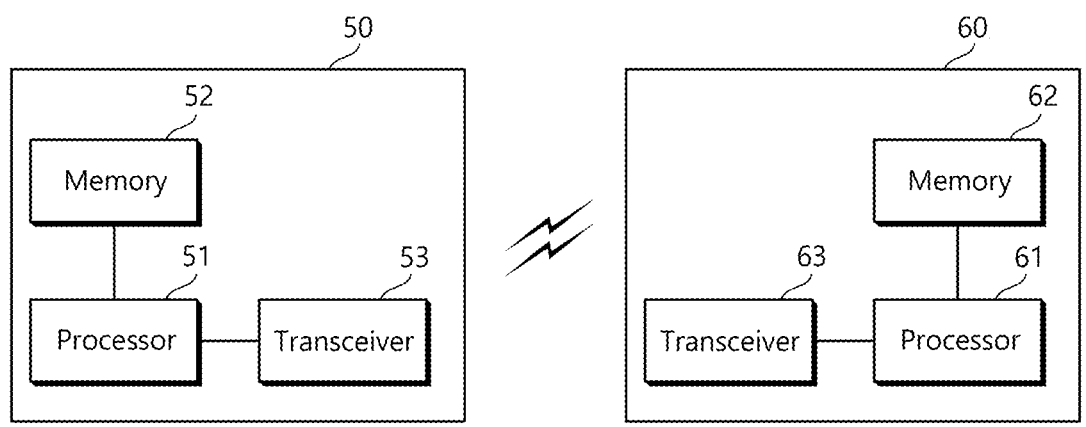
FIG. 6 is a block diagram showing a wireless communication system for implementing an embodiment of the present invention.

FIG. 6 is a block diagram showing a wireless communication system for implementing an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for supporting a variable bandwidth in a wireless communication system, the method comprising:
receiving, by a wireless device, a synchronization signal in a first bandwidth;
acquiring, based on the synchronization signal, a second bandwidth for a downlink (DL) channel; and
receiving, by the wireless device, the DL channel in the second bandwidth,
wherein the synchronization signal includes a primary synchronization signal (PSS) for acquiring time/frequency synchronization and a secondary synchronization signal (SSS) for detecting a physical cell identifier (PCI), and wherein a sequence of the PSS varies depending on a size of the second bandwidth.

2. The method of claim 1, wherein the first bandwidth is defined by 12 subcarriers having a subcarrier spacing of 15 kHz.

3. The method of claim 2, wherein the second bandwidth is wider than or equal to the first bandwidth.

4. The method of claim 1,
wherein a radio frame includes 10 subframes, and
wherein the PSS is received in a sixth subframe of every radio frame, and the SSS is received in a last subframe of every two radio frames.

5. The method of claim 1, wherein a sequence for the SSS varies depending on a size of the second bandwidth.

6. The method of claim 1, wherein the synchronization signal further includes an additional synchronization signal.

7. The method of claim 6, wherein the additional synchronization signal is received in a bandwidth indicating the second bandwidth.

8. The method of claim 6, wherein the additional synchronization signal is received in a subframe different from the PSS and the SSS.

9. The method of claim 1, wherein the DL channel includes a broadcast channel which carries system information.

10. The method of claim 1, wherein the DL channel includes a DL control channel used for scheduling of a DL data channel.

11. An apparatus configured to support a variable bandwidth in a wireless communication system, the apparatus comprising:
a transceiver configured to transmit and receive a radio signal; and
a processor coupled to the transceiver and configured to:
receive a synchronization signal in a first bandwidth via the transceiver;
acquire, based on the synchronization signal, a second bandwidth for a downlink (DL) channel; and
receive the DL channel in the second bandwidth via the transceiver,
wherein the synchronization signal includes a primary synchronization signal (PSS) for acquiring time/frequency synchronization and a secondary synchronization signal (SSS) for detecting a physical cell identifier (PCI), and
wherein a sequence of the PSS varies depending on a size of the second bandwidth.

12. The apparatus of claim 11, wherein the first bandwidth is defined by 12 subcarriers having a subcarrier spacing of 15 kHz.

13. A processing device configured to control an apparatus to support a variable bandwidth in a wireless communication system, the processing device comprising:
at least one processor; and
at least one computer memory operably connected to the at least one processor and storing instructions that, based on being executed by the at least one processor, perform operations comprising:
receiving a synchronization signal in a first bandwidth;
acquiring, based on the synchronization signal, a second bandwidth for a downlink (DL) channel; and
receiving the DL channel in the second bandwidth,
wherein the synchronization signal includes a primary synchronization signal (PSS) for acquiring time/frequency synchronization and a secondary synchronization signal (SSS) for detecting a physical cell identifier (PCI), and
wherein a sequence of the PSS varies depending on a size of the second bandwidth.

* * * * *